Jan. 16, 1945.        D. G. FAWKES        2,367,640
VALVE CLOSURE MEMBER
Filed Nov. 23, 1942         2 Sheets-Sheet 1
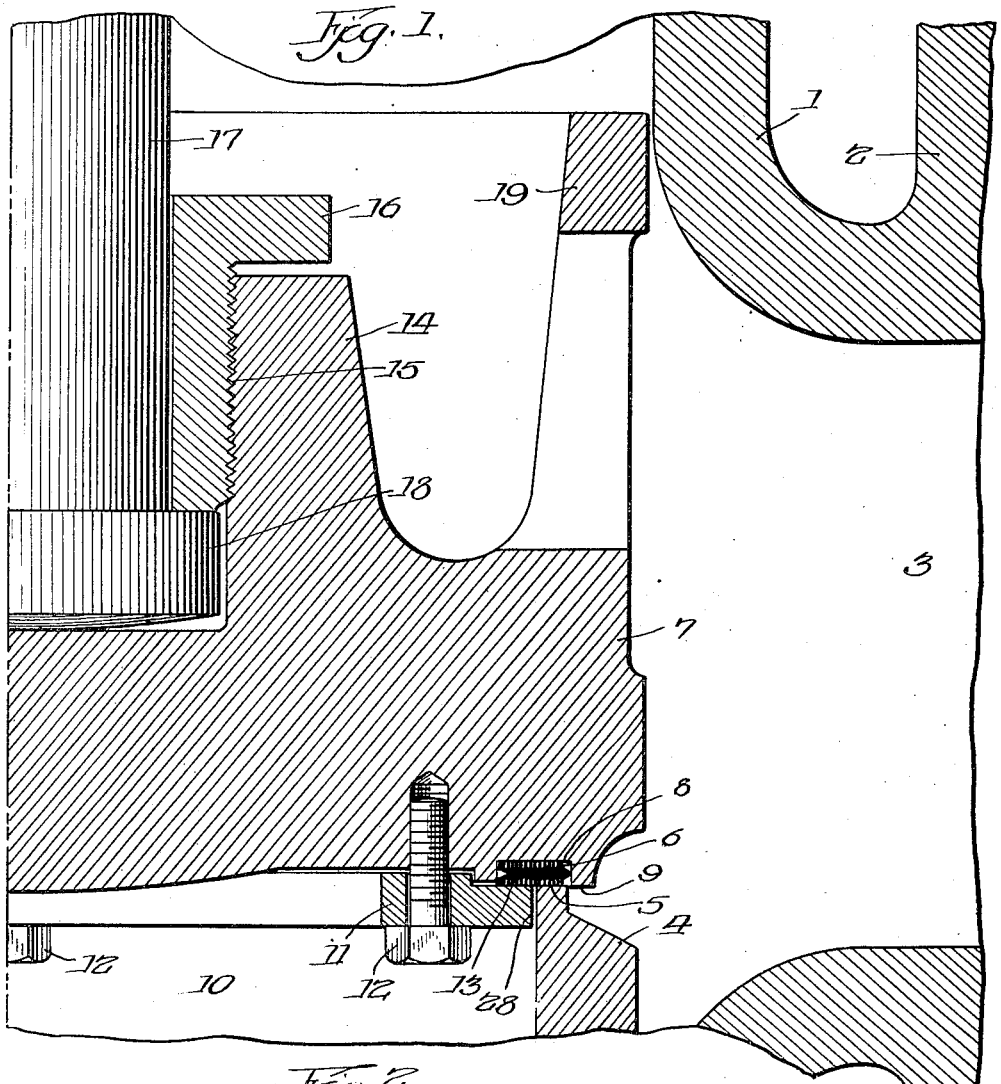
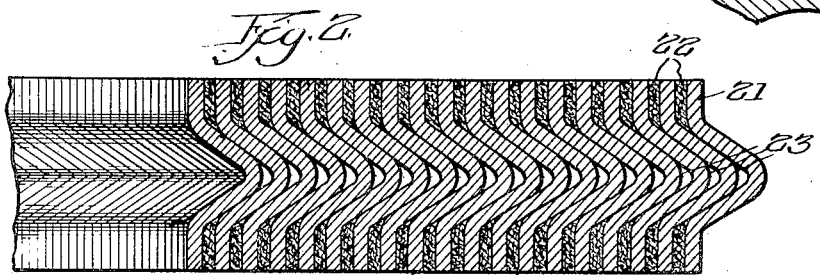
Inventor:
Donald G. Fawkes
By Joseph O. Lange
Atty.

Jan. 16, 1945.　　　D. G. FAWKES　　　2,367,640
VALVE CLOSURE MEMBER
Filed Nov. 23, 1942　　　2 Sheets-Sheet 2
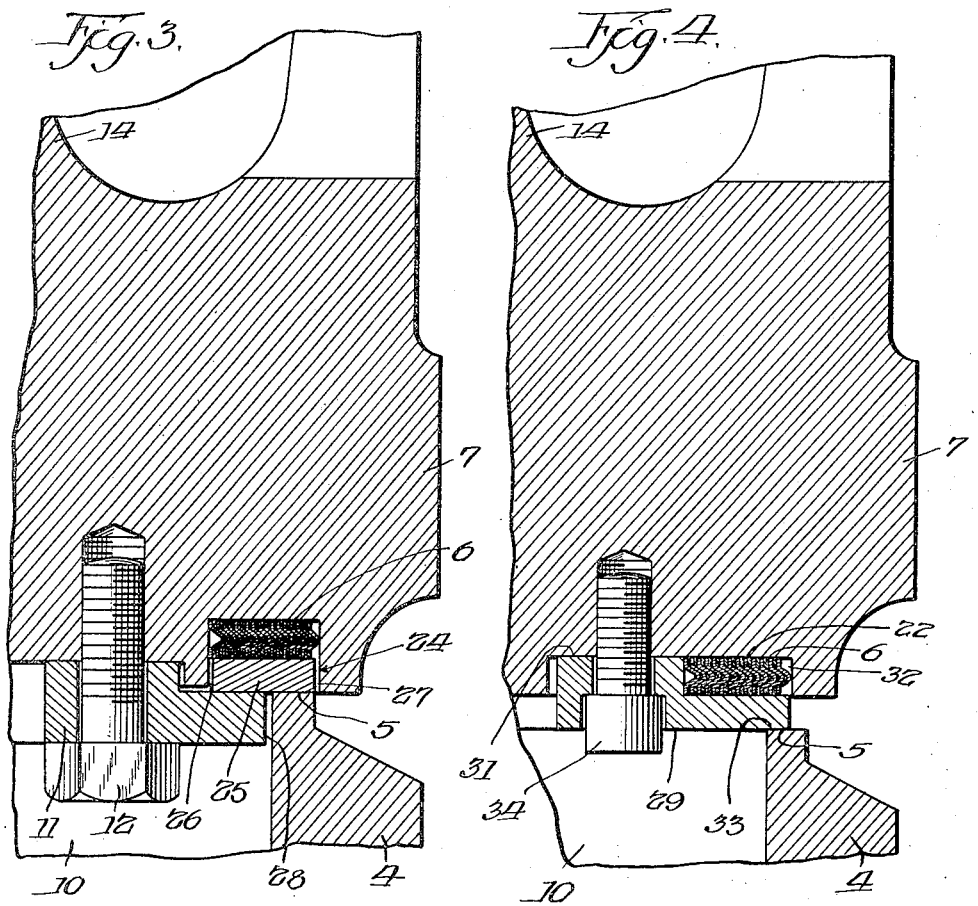
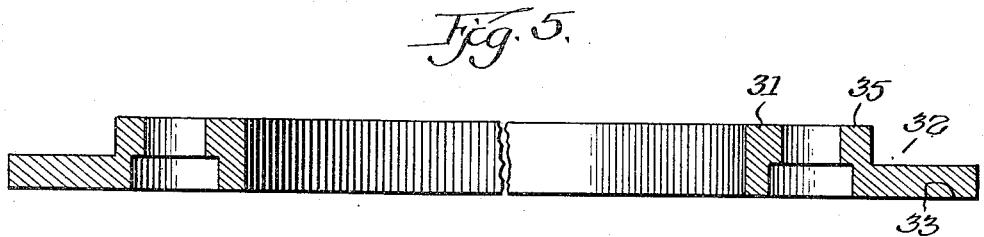
Inventor:
Donald G. Fawkes
By: Joseph O. Lange
Atty.

Patented Jan. 16, 1945

2,367,640

UNITED STATES PATENT OFFICE 2,367,640

VALVE CLOSURE MEMBER

Donald G. Fawkes, Chicago, Ill., assignor to Crane Co., Chicago, Ill., a corporation of Illinois Application November 23, 1942, Serial No. 466,679

2 Claims. (Cl. 251—160)

This invention relates to valves and more particularly refers to the provision of a novel form of valve closure member or disc construction in which improved performance is obtained in connection with securing and maintaining valve tightness.

More specifically, an important purpose of the invention is to assure greater uniformity of unit bearing load throughout the length and area of the seat bearing under conditions in which the seat and disc or closure member are susceptible to greater thermal or mechanical distortion than can normally be maintained with the conventional and relatively rigid valve seat members usually employed.

In general, it may be stated that greater seating flexibility is obtained by means of spiral wound gaskets with the transverse edges thereof forming the seat contact surface, and which are preferably supplemented by reinforcing metal similarly arranged in spiral form, as hereinafter referred to in greater detail.

It has been found that the latter construction when placed between the spirally extending gasket layers promotes an improved seating surface and also serves as a protective shield for the gasket material which may be asbestos or the like. In other modifications, the gasket contact surfaces may be covered with metal, as for example by means of a spray, or the gasket may be provided with a sheet metal jacket, if desired.

Other important objects will become apparent upon proceeding with the following description read in light of the disclosure of the drawings, in which Fig. 1 is a fragmentary sectional assembly view of the valve embodying my invention.

Fig. 2 is a magnified view of the spiral wound gasket constituting a closure member seating surface arrangement.

Fig. 3 is a modified form of the invention.

Fig. 4 is a further modified form.

Fig. 5 is a detailed view of one of the members constituting the improved form in Fig. 4.

Similar reference characters refer to similar parts throughout the various figures.

Referring now to Fig. 1, the usual valve body or casing generally designated 1 is indicated having the conventional flange connections 2 shown in part and is provided with the port opening 3 leading within to a valve seat 4 either integral therewith or else formed as a separate inserted part of the casing. The seat is provided at its upper portion with the flat surface 5 against which transverse surfaces of the spiral gasket 6 abut during the closed position of the valve. The disc holder 7 is of the usual type having at its lower portion an annular groove 8 within which the gasket member 6 is securely positioned. The said annular groove is preferably of a depth less than the thickness of the gasket 6 and has its peripheral limits defined by the portion 9. The disc holder 7 at its under portion is fitted with the annular retaining ring 11, the latter being secured to the disc holder by means of a plurality of annularly arranged cap screws 12, or else by using a single centrally positioned screw, depending upon the size of the closure member employed. Thus it will be apparent that by the foregoing arrangement the closure member with its gasket serves to control the flow through the seat port 10 within the valve casing. It will be further noted that the ring member 11 contacts the face 13 of the gasket 6, the amount of such compression of the gasket in seating the valve being sufficient to effect valve tightness.

As more clearly shown in detail in the magnified view of Fig. 2, the spiral arranged gasket layers or sections are maintained without crushing or distortion and permit the gasket to have the necessary freedom of motion in its response radially outward to line flow or pressure within the port 10. It has been observed that the spiral arranged layers of the closure member gasket 6 acting under the influence of line pressure, as just described, thereby provide a desirable wiping action upon the seating surface 5. To those skilled in the art it will be further apparent that this gasket arrangement permits, in addition to the flexible seating of the closure member, the advantage of a scouring action whereby such accumulations of foreign matter as may normally be deposited on the valve seat during the course of actual service may be removed, which otherwise might result in objectionable valve leakage. As indicated, the closure member is provided at its upper portion with the usual boss 14 tapped as at 15 with the threads to accommodate the stem hole bushing 16 for retaining the stem 17 in secure assembled relation with the closure member by means of gripping stem head 18. The latter described construction is conventional and there is no novelty attached to this arrangement. The closure member may also be provided at its upper portion with the annular, ported extension 19 for purpose of providing guiding means within the casing 1 during the reciprocal movement of the closure member in opening and closing the valve.

As shown more clearly in the magnified view of

Fig. 2, the use of the shield 21 as a protective cover for the gasket material 22 allows for flexing movement between the spiral wound sections without creating excessive wear and at the same time permits line pressure to enter between the wound metal sections or layers, as indicated at 23, to thereby further the outward expansion of the spiral wound gasket sections to produce the scouring action previously referred to.

There may be instances in service in which the use of a mere spiral wound gasket directly contacting a seating surface may not be satisfactory in realization of the harmful erosive effects of line flow under high velocity which tends to cut out or wear away the gasket contact surface. Under such conditions it has been found desirable to use the modified form of construction shown in Fig. 3 in which the disc holder member 7 is provided with an additional annular protective medium for the spiral wound gasket 6. In this modified form the general construction is identical to that employed in Fig. 1 except that it will be noted that the groove 24 is made of sufficient depth to not only accommodate the gasket 6 but in addition allows for the use of an annular contact ring 25 which bears against the gasket 6 and is suitably retained within the groove 24, as indicated. Thus in addition to protecting the gasket 6 against the direct erosive action of line flow, the ring 25 by reason of its inner and outer annular clearances, as indicated at 26 and 27 respectively, is transversely movable relative to the valve seat 5. Therefore the same desirable transverse sweeping or wiping action is obtained in the manner described in connection with Fig. 1. In all cases it will be noted that sufficient peripheral clearance, as indicated at 28, is provided so that just before seating of the valve, pressure aids in effecting valve seat tightness in a manner similar to that described in connection with the other construction.

Referring now to the modified form in Fig. 4, the closure member 7 is provided with a novel shoulder type of retaining ring 29 having the outer relieved bearing surface 31 to thereby form the annular recess or clearance 32 for retention of the gasket member 6, the casing seat 5 making the conventional contact with the lower portion 33 of the ring, as described in connection with Fig. 3. The usual bolts 34 are employed to hold the retaining ring 29 in position. Thus it will be apparent that as the valve closure member in closing the valve contacts the seat 5, the outer periphery of the ring 29 will be slightly flexed. Line pressure enters back of the ring past the non-sealing surface portion at 35 and will similarly cause the gasket 6 to be forced radially outward and thereby increasing the tightness of the seat contact since the gasket 6 by its outward radial movement also serves as a wedge to reduce the further flexing of the outer portion of the retaining ring 29. Line pressure will necessarily assist as in the other forms of construction in making a tighter seat and the retaining ring 29 will protect the gasket against the objectionable erosive action of line flow.

It will be evident from the several modifications described that this invention is capable of numerous adaptations without departing from the spirit of the invention. It is desired therefore to be limited only to the extent of the claims appended hereto interpreted in the light of the prior art.

I claim:

1. In a valve, a valve seat, a closure member therefor, the latter comprising a gasket having substantially spirally wound undulations extending transversely to the valve seat, a flexible ring member placed thereover to provide jointly a seating surface for the said closure member and to serve as a shield for the said gasket, the contact surface of the said ring member having an annular outer portion permitting suitable flexing of the ring member, the said gasket being capable of change under pressure whereby upon actuation by line pressure in a radial direction the said gasket serves as a supporting means for the said ring member.

2. In a valve, a valve seat, a closure member therefor, the latter comprising a gasket having annular contacting surface means with substantially spirally wound undulations extending transversely to the valve seat, a ring member positioned thereover to provide a seating surface for the said closure member and having an annular raised portion cooperating with the latter member to provide a substantial enclosure for the said gasket, the said ring member having a relatively flexible annular gasket supporting portion, the said gasket being in communication with the pressure side of the valve seat and being capable of change under pressure whereby resistance to flexing by the said ring member in seating the said closure member is effected by the outward expansion of the said gasket.

DONALD G. FAWKES.